United States Patent

(12) Kobayashi

(10) Patent No.: US 11,872,871 B2
(45) Date of Patent: Jan. 16, 2024

(54) VEHICULAR BELT MOLDINGS

(71) Applicant: TOKAI KOGYO CO., LTD., Obu (JP)

(72) Inventor: Yosuke Kobayashi, Obu (JP)

(73) Assignee: TOKAI KOGYO CO., LTD., Obu (JP)

( * ) Notice: Subject to any disclaimer, the term of this patent is extended or adjusted under 35 U.S.C. 154(b) by 663 days.

(21) Appl. No.: 17/049,997

(22) PCT Filed: Apr. 24, 2019

(86) PCT No.: PCT/JP2019/017448
§ 371 (c)(1),
(2) Date: Oct. 23, 2020

(87) PCT Pub. No.: WO2019/208638
PCT Pub. Date: Oct. 31, 2019

(65) Prior Publication Data
US 2021/0094398 A1 Apr. 1, 2021

(30) Foreign Application Priority Data
Apr. 26, 2018 (JP) ................. 2018-085119

(51) Int. Cl.
*B60J 10/75* (2016.01)
*B60J 10/50* (2016.01)

(52) U.S. Cl.
CPC ............... *B60J 10/75* (2016.02); *B60J 10/50* (2016.02)

(58) Field of Classification Search
CPC . B60J 10/75; B60J 10/50; B60J 10/17; B60Y 2306/09
(Continued)

(56) References Cited

U.S. PATENT DOCUMENTS

2007/0227072 A1 10/2007 Kawase et al.
2013/0305611 A1 11/2013 Wende
2015/0266366 A1 9/2015 Kuno

FOREIGN PATENT DOCUMENTS

CN 103386875 A 11/2013
CN 106364292 A 2/2017
(Continued)

OTHER PUBLICATIONS

Mar. 29, 2023 Office Action issued in Chinese Patent Application No. 201980028511.5.
(Continued)

*Primary Examiner* — Dennis H Pedder
(74) *Attorney, Agent, or Firm* — Oliff PLC

(57) ABSTRACT

A belt molding which is capable of easily and stably suppressing the generation of abnormal noise when coming into sliding contact with a window pane. Each of belt moldings is configured to be mounted along a lower edge of a window opening of a vehicle door and come into sliding contact with the window pane which is raised and lowered in the window opening. Each of the belt moldings includes body portions configured to be mounted to door panels of the vehicle door and sealing portions configured to be in elastic contact with the window pane. The sealing portions includes contact portions at the portions configured to be in contact with the window pane, respectively. The contact portions have fiber layers formed by attaching numerous fibers, respectively. Attached density of fibers in the fiber layers is 100 to 600 fibers/mm$^2$.

4 Claims, 3 Drawing Sheets

(58) Field of Classification Search
USPC .................................................... 296/146.2
See application file for complete search history.

(56) References Cited

FOREIGN PATENT DOCUMENTS

| | | |
|---|---|---|
| JP | H04-345527 A | 12/1992 |
| JP | H05-44637 U | 6/1993 |
| JP | H10-331028 A | 12/1998 |
| JP | 2002-219944 A | 8/2002 |
| JP | 2011-251426 A | 12/2011 |
| KR | 2014-0116613 A | 10/2014 |
| WO | 2014/054757 A1 | 4/2014 |

OTHER PUBLICATIONS

Jun. 11, 2019 International Search Report issued in International Patent Application No. PCT/JP2019/017448.
Jun. 11, 2019 Written Opinion issued in International Patent Application No. PCT/JP2019/017448.
Dec. 14, 2021 Extended Search Report issued in European Patent Application No. 19791573.9.

VEHICULAR BELT MOLDINGS

TECHNICAL FIELD

The present invention relates to a belt molding for vehicle which is mounted along a lower edge of a window opening of a vehicle door.

BACKGROUND ART

A window opening is provided in a vehicle door for opening and closing an opening of a vehicle body. A window pane (window glass) is installed in the window opening so as to be movable up and down. A long belt molding is mounted to a lower edge of the window opening. The belt molding is in elastic contact with the window pane (pressure contact in an elastically deformed state) to seal between the vehicle body panel and the window pane. When the window pane is raised and lowered, the belt molding rubs (comes into sliding contact with) the window pane in an elastic contact state. In this way, water and dust or the like on the surface of the window pane are wiped off. This type of belt molding has a body portion mounted to a door panel of a vehicle door and a sealing portion elastically contacting the window pane. The sealing portion is in elastic contact with or comes into sliding contact with the window pane.

In a case where the frictional resistance between the belt molding and the window pane is high, abnormal noise is generated when the belt molding comes into sliding contact with the window pane. Therefore, conventionally, a belt molding to which numerous fine fibers are attached at a contact portion of the sealing portion with the window pane has been developed. In this way, the frictional resistance between the sealing portion and the window pane is reduced, and the generation of abnormal noise is suppressed. However, it is insufficient to reduce the frictional resistance by simply attaching the fibers at the contact portion with the window pane. Therefore, in the conventional belt molding, abnormal noise is often generated.

Therefore, belt moldings for suppressing the generation of such abnormal noise are disclosed in JP-U-Hei.5-44637 and JP-A-2014/054757. In JP-U-Hei.5-44637, numerous fiber bodies provided at the contact portion of the sealing portion with the window pane are coated with a low friction agent.

In JP-A-2014/054757, since the functions and effects and the like, which are required for each of a plurality of the sealing portions, are different from each other, fibers of different materials, lengths or thicknesses are attached according to each of the portions. In this way, the elastic contact state can be optimized for each portion and the generation of abnormal noise can be suppressed.

SUMMARY OF INVENTION

Technical Problem

However, in JP-U-Hei.5-44637, since each fiber is coated with the low friction agent, cost increases due to an increase in manufacturing processes or manufacturing costs or the like. Further, there is a problem that the coating is worn and the friction reducing effect decreases over time.

As a principle that abnormal noise is generated when fibers are attached at the contact portion, a case due to frictional resistance and a case due to stick-slip phenomenon are included. The stick-slip phenomenon occurs in a state where fibers are erected (almost not deformed) with respect to the window pane. In detail, tips of the fibers get caught on the surface of the window pane in a state of pushing the surface of the window pane. When the window pane is further raised and lowered in this state, the tips of the fibers are released from being caught beyond the limit, and the tips of the fibers get caught repeatedly. Further, abnormal noise is generated every time at which the fibers are released from being caught. Therefore, the stick-slip phenomenon is less likely to occur when the fibers are in a flexible state. In this regard, although Patent Literature 1 attempts to reduce the frictional coefficient, Patent Literature 1 does not pay attention to the occurrence of the stick-slip phenomenon, that is, the ease of bending of each of the fibers.

In JP-A-2014/054757, the elastic contact state is optimized for each portion of the sealing portion also in consideration of the ease of bending. Therefore, the effect of suppressing the generation of abnormal noise can be stably expected. However, it is troublesome to vary the fiber material, the fiber thickness or the like for each portion, and there is also a problem in productivity.

Therefore, the present invention has been made to solve the above-described problems and an object thereof is to provide a belt molding for vehicle capable of easily and stably suppressing the generation of abnormal noise when coming into sliding contact with the window pane.

Solution to Problem

A belt molding for vehicle of the present invention is mounted along a lower edge of a window opening of a vehicle door and comes into sliding contact with a window pane which is raised and lowered in the window opening. The belt molding for vehicle includes a body portion configured to be mounted to a door panel of the vehicle door, and a sealing portion configured to be in elastic contact with the window pane. The sealing portion has a contact portion formed by attaching numerous fibers at a portion configured to be in contact with the window pane. Attached density of the fibers is 100 to 600 fibers/mm$^2$.

Meanwhile, the "contact" in the present invention is a general term (superordinate concept) including sliding contact, elastic contact, pressure contact, abutment or the like.

Preferably, a strip-shaped (elongated) sheet member to which fibers are attached in advance is sticked to the contact portion. When a plurality of the sealing portions is formed, the attached densities of the fibers at each of the sealing portions may be varied from each other.

Advantageous Effects of Invention

When the attached density of fibers at the contact portion is set in a predetermined range, the fibers are moderately in a dense state. That is, since the attached fibers are densely packed to some extent, it is possible to secure original effect of suppressing of generation of abnormal noise by attaching the fibers. Further, since the attached fibers are densely packed to some extent, the outer surface (skin surface) of the base member (sealing portion) appears to be covered by the fibers without being exposed. In this way, it is possible to prevent the appearance from being deteriorated.

On the other hand, the attached fibers are not too densely packed. Thereby, there is enough space to allow the fibers to bend appropriately when (the sealing portion of) the belt molding is in sliding contact with the window pane in an elastic contact state. Therefore, the stick-slip phenomenon is less likely to occur and the generation of abnormal noise can be suppressed. Further, since the attached fibers are not too densely packed, generation of static electricity between the belt molding and the window pane is also suppressed. Also in this respect, the generation of abnormal noise can be effectively reduced.

Further, a plurality of types of fibers having different lengths and materials or the like are not necessarily used. The present invention can easily and stably suppress the generation of abnormal noise by these factors.

When the strip-shaped sheet member to which fibers are attached in advance is bonded to the contact portion, there is no influence of the shape of the base member when the fibers are attached. Therefore, variation in the number of attached fibers is small and uniform, and the attached density is easily adjusted.

In a case where a plurality of the sealing portions are formed, the elastic contact state and sliding contact condition with the window pane in each of the sealing portions are not necessarily the same. Therefore, even among the sealing portions, there are locations where abnormal noise is likely to be generated and locations where abnormal noise is less likely to be generated. Thus, it is possible to more effectively suppress the generation of abnormal noise by varying the attached density of the fibers according to the ease of generation of such abnormal noise.

DESCRIPTION OF EMBODIMENTS

Hereinafter, an embodiment of the present invention will be described. First, generally, a belt molding is configured to be mounted along a lower edge of a window opening of a vehicle door. A window pane is installed in the window opening so that the window pane can be raised and lowered. The belt molding is configured to be in elastic contact with the window pane. The belt molding comes into sliding contact with the window pane when the window pane is raised and lowered in the window opening. The belt molding includes a body portion configured to be mounted to a door panel of the vehicle door and a sealing portion configured to be in elastic contact with the window pane. The belt molding has a contact portion, in which numerous fibers are attached, at a portion of the sealing portion configured to be in contact with the window pane. The belt molding to which the present invention is applied can be applied to all belt moldings that have been conventionally existed, so long as it has the body portion, the sealing portion and the contact portion as described above. That is, the specific shape of the belt molding is not particularly limited so long as it has the body portion, the sealing portion and the contact portion. In particular, the belt molding having two sealing portions is illustrated in the embodiment described later, but the number of the sealing portions may be one or three or more. The belt molding is also referred to as a belt molding, a weather strip or a water wiping seal.

Figure 1:
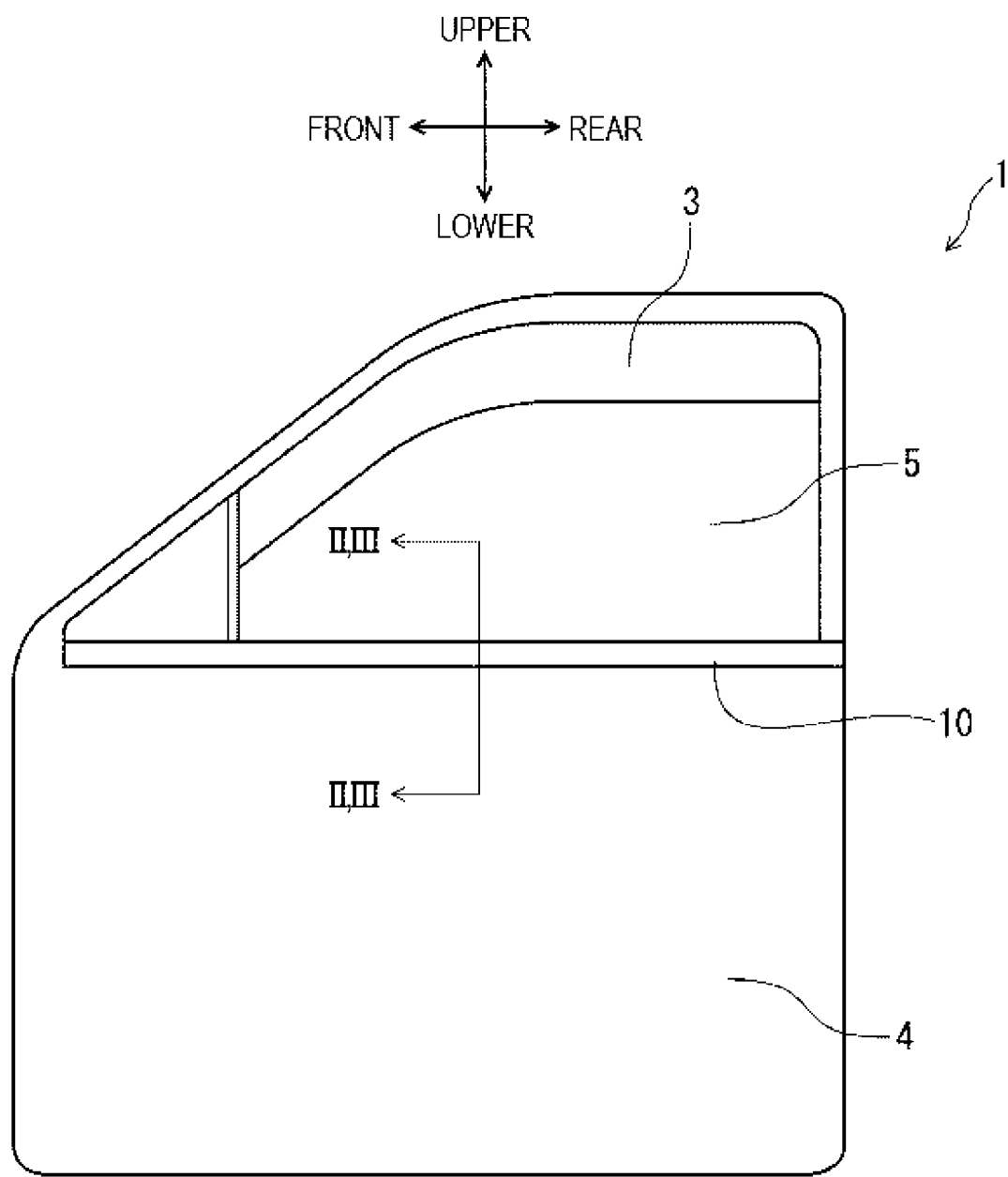
FIG. 1 A side view of a vehicle door is shown.

The belt molding includes an outer belt molding disposed on the vehicle exterior side of the window pane and an inner belt molding disposed on the vehicle interior side of the window pane. As shown in FIG. 1, the belt molding is mounted to a lower edge of a window opening 3 of a vehicle door 1 along a front and rear direction of a vehicle. Since FIG. 1 is a side view seen from the vehicle exterior side, an outer belt molding 10 is shown in FIG. 1. Meanwhile, a reference numeral 4 denotes a door panel, and a reference numeral 5 denotes a window pane. Although a front door is shown in FIG. 1, the belt molding is also mounted to a similar place of a rear door. The present invention may be applied to the belt moldings of both the front door and the rear door or may be applied to only one of the belt moldings.

Figure 2:
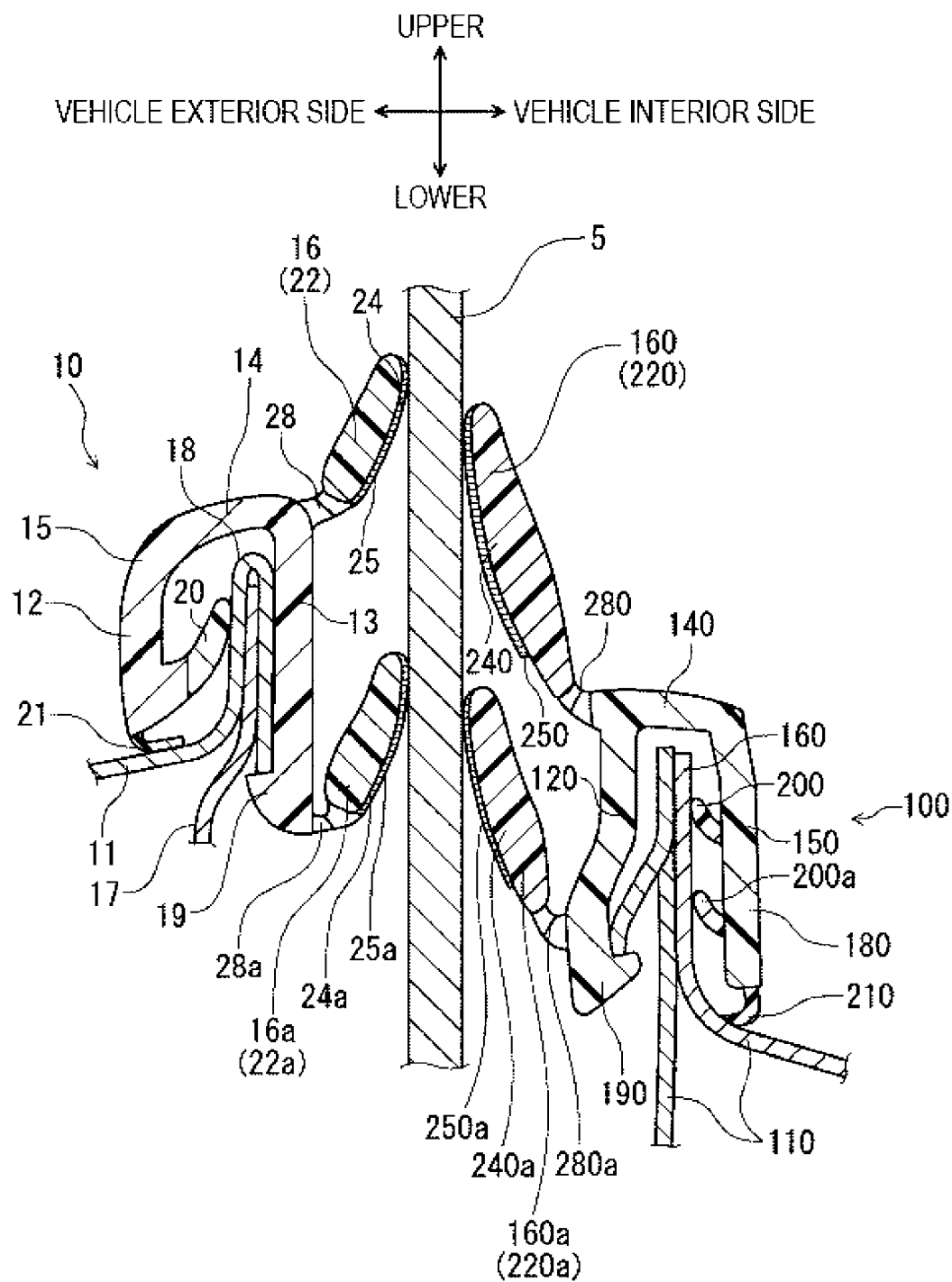
FIG. 2 A sectional view taken along the line II-II in FIG. 1 is shown.

As shown in FIG. 2, the door panel 4 includes an outer door panel 11 and an inner door panel 110. The outer belt molding 10 is mounted to the outer door panel 11. An inner belt molding 100 is mounted to the inner door panel 110. The inner belt molding 100 may be mounted to a door trim (not shown). A window pane 5 is disposed between the outer belt molding 10 and the inner belt molding 100. The window pane 5 can be raised and lowered in an upper and lower direction by an actuator such as a motor (not shown).

The outer belt molding 10 is in elastic contact with the vehicle exterior surface of the window pane 5 for sealing. The inner belt molding 100 is in elastic contact with the vehicle interior surface of the window pane 5 for sealing. The outer belt molding 10 and the inner belt molding 100 come into sliding contact with the window pane 5 when the window pane 5 is raised and lowered. In this way, water droplets and foreign matters (sand, dusts, etc.) adhering to the surface of the window pane 5 are wiped off, and the side view of an occupant is kept good.

The outer belt molding 10 includes a body portion 15 and a sealing portion. In the present embodiment, two sealing portions 16, 16a are formed. The body portion 15 has a substantially U-shaped cross section. The body portion 15 includes a vehicle exterior sidewall portion 12, a vehicle interior sidewall portion 13, and a connecting portion 14. The vehicle exterior sidewall portion 12 and the vehicle interior sidewall portion 13 are elongated and arranged in parallel in the vehicle inner and outer direction at a predetermined interval from each other. The connecting portion 14 connects upper edges of the vehicle exterior sidewall portion 12 and the vehicle interior sidewall portion 13. Each of the sealing portions 16, 16a is formed to protrude from an outer surface of the vehicle interior sidewall portion 13 toward the window pane 5. The outer surface of the vehicle interior sidewall portion 13 is a surface facing the window pane 5 in a state where the belt molding 10 is mounted to the vehicle door 1.

In the present embodiment, an upper edge of the outer door panel 11 is hemmed to be in a state where the upper edge of the outer door panel 11 is folded back so as to wrap an upper edge of a reinforcement 17, thereby forming a flange portion 18. The flange portion 18 is inserted into the body portion 15 of the belt molding 10. In this way, the outer belt molding 10 is mounted to the upper edge of the outer door panel 11. The outer belt molding 10 includes an engaging portion 19, a holding lip 20, and a cover lip 21. The engaging portion 19 is formed by expanding a lower edge of an inner surface of the vehicle interior sidewall portion 13. The holding lip 20 is formed to protrude from an inner surface of the vehicle exterior sidewall portion 12. The cover lip 21 is formed to protrude from a lower edge of the vehicle exterior sidewall portion 12. The engaging portion 19 is engaged with a folded-back tip of the flange portion 18 in a state where the outer belt molding 10 is mounted to the outer door panel 11. The holding lip 20 elastically contacts the flange portion 18 in a state where the outer belt molding 10 is mounted to the outer door panel 11. The cover lip 21 is in elastic contact with the outer door panel 11 in a state where the outer belt molding 10 is mounted to the outer door panel 11. The outer belt molding 10 is held on the outer door panel 11 by the engaging portion 19, the holding lip 20, and the cover lip 21.

The sealing portions 16, 16a protrude from an upper edge and a lower edge of the vehicle interior sidewall portion 13 toward the window pane 5, respectively. The sealing portions 16, 16a have seal body portions 22, 22a, seal root portions 23, 23a, and contact portions 24, 24a, respectively. Each of the seal body portions 22, 22a has a lip shape. The seal root portions 23, 23a are thinner than the seal body portions 22, 22a, respectively, and are highly deformable. When the outer belt molding 10 comes into sliding contact with the window pane 5, the sealing portions 16, 16a are deformed around the seal root portions 23, 23a, respectively. The contact portions 24, 24a are formed on the outer surfaces of the seal body portions 22, 22a, respectively. That is, the contact portions 24, 24a are formed on the surfaces where the seal body portions 22, 22a are in contact with the window pane 5, respectively. The contact portions 24, 24a have fiber layers 25, 25a for reducing sliding resistance with the window pane 5, respectively. The fiber layers 25, 25a are formed by attaching numerous fibers (pile) substantially upright on the surfaces of the contact portions 24, 24a, respectively.

The inner belt molding 100 also has substantially the same structure as the outer belt molding 10. That is, the inner belt molding 100 also includes a body portion 150 including a vehicle exterior sidewall portion 120, a vehicle interior sidewall portion 130 and a connecting portion 140, and a plurality of (two in the present embodiment) the sealing portions 160, 160a protruding from the vehicle exterior sidewall portion 120 toward the window pane 5. When the body portion 150 is mounted to a flange portion 180 of the inner door panel 110, an engaging portion 190 engages with a cut-and-raised portion of the flange portion 180, and each of holding lips 200, 200a and a cover lip 210 are in elastic contact with the surface of the inner door panel 110. The sealing portions 160, 160a of the inner belt molding 100 also have seal root portions 230, 230a which are more easily deformed than seal body portions 220, 220a, respectively, and contact portions 240, 240a which is in contact with the window pane 5, respectively. The contact portions 240, 240a also have fiber layers 250, 250a formed by attaching numerous fibers, respectively. Interior decorative member such as a door trim (not shown) is placed on the vehicle interior side of the inner belt molding 100 in the present embodiment.

The body portion 15 of the outer belt molding 10 and the body portion 150 of the inner belt molding 100 are made of materials that can be molded by extrusion molding, injection molding or the like. For example, thermoplastic elastomers, thermoplastic resins, rubbers or the like can be used. Specifically, olefin-based thermoplastic elastomer (TPO), styrene-based elastomer (TPS), vinyl chloride resin (PVC), polypropylene resin (PP), and ethylene-propylene-diene copolymer (EPDM) or the like can be used. As the material for forming each of the body portions 15, 150, material whose durometer hardness (type D) according to JIS K 7215 is HDD 50 to 80 is preferably used.

The sealing portions 16, 16a of the outer belt molding 10 and the sealing portions 160, 160a of the inner belt molding 100 are also made of materials which can be molded by extrusion molding, injection molding or the like and which are softer and more elastically deformable than the body portions 15, 150, respectively. For example, thermoplastic elastomers, thermoplastic resins, rubbers or the like can be used. Specifically, olefin-based thermoplastic elastomer (TPO), styrene-based elastomer (TPS), vinyl chloride resin (PVC), polypropylene resin (PP), and ethylene-propylene-diene copolymer (EPDM) or the like can be used. As the material for forming each of the sealing portions 16, 16a, 160, 160a, material whose durometer hardness (type A) according to JIS K 7215 is HDA 50 to 90 is preferably used.

The holding lip 20 and the cover lip 21 of the body portion 15 are made of the same material as the sealing portions 16, 16a, and the holding lips 200, 200a and the cover lip 210 of the body portion 150 are made of the same material as the sealing portions 160, 160a.

A core member made of metal or hard resin may be embedded in the body portion 15 of the outer belt molding 10 and in the body portion 150 of the inner belt molding 100. In this way, a holding force when the outer belt molding 10 and the inner belt molding 100 are respectively mounted to the flange portions 18, 180 is improved. In this case, each of the body portions 15, 150 can be formed by covering the periphery of the core member with an elastically deformable material having the same degree of hardness as the sealing portions 16, 16a, 160, 160a.

First, the body portion 15 and the sealing portions 16, 16a of the outer belt bolding 10 are integrally molded by co-extrusion molding, and the body portion 150 and the sealing portions 160, 160a of the inner belt molding 100 are integrally molded by co-extrusion molding. Simultaneously with or after the extrusion molding, each of the fiber layers 25, 25a of the contact portions 24, 24a is molded.

Then, each processing for mounting the outer belt molding 10 and the inner belt molding 100 to the vehicle door 1 is performed. Specifically, for each of the outer belt molding 10 and the inner belt molding 100, press processing of both ends in a longitudinal direction and attachment of accessories such as clips are performed.

Figure 3:
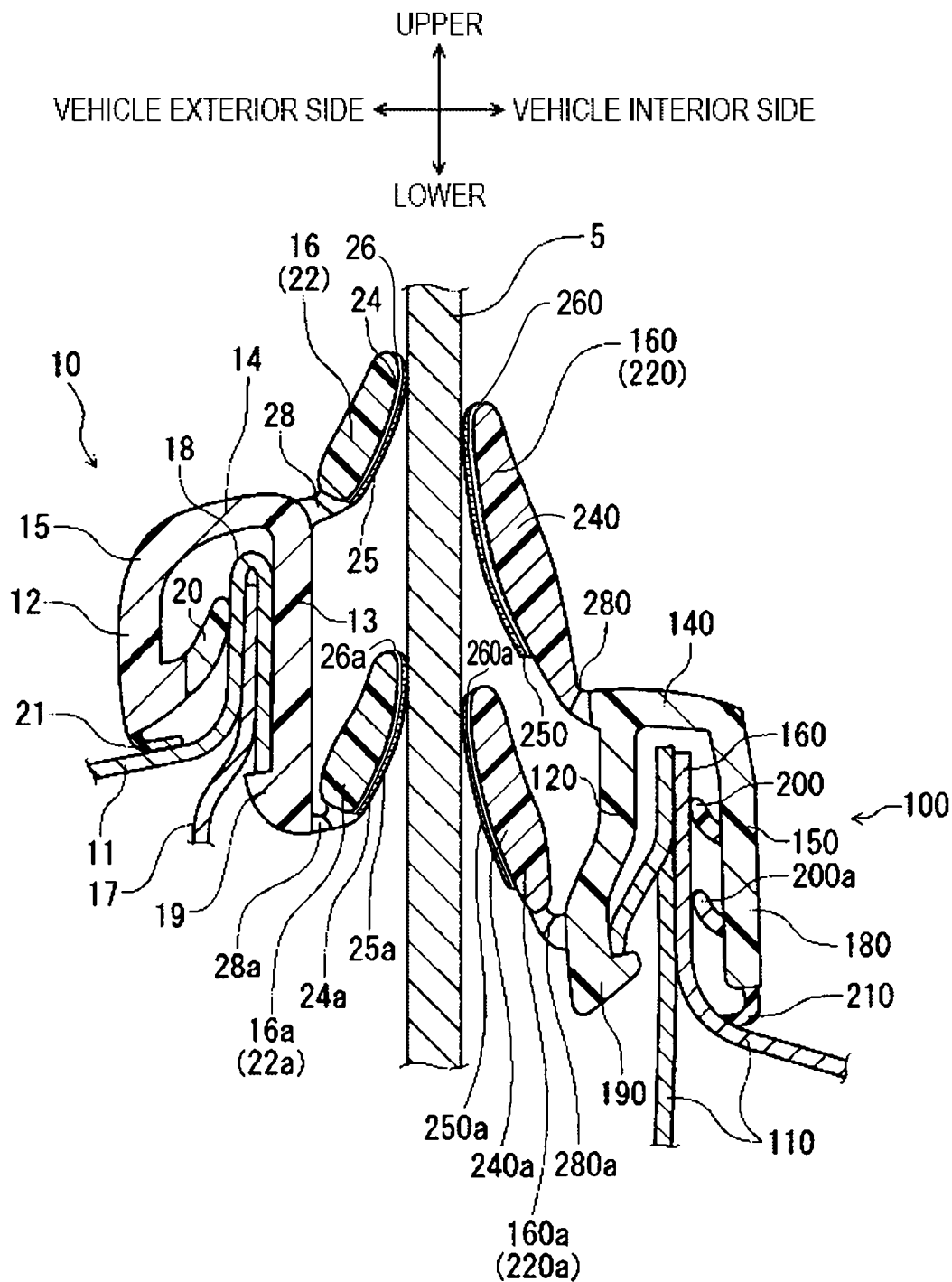
FIG. 3 An alternative embodiment of the view in FIG. 2.

Each of the fiber layers 25, 25a, 250, 250a can be formed by attaching a large number of fibers with electrostatic flocking or spraying or the like. Alternatively, each of the fiber layers 25, 25a, 250, 250a may be formed by affixing a strip-shaped sheet member 26, 26a, 260, 260a to which fibers are attached at a tape in advance as illustrated by FIG. 3. Further, a plurality of these attachment methods can be used in combination. For example, the fiber layers 25, 250 can be formed on the upper sealing portions 16, 160, respectively, by affixing a sheet member, and the fiber layers 25a, 250a can be directly formed on the lower sealing portions 16a, 160a, respectively, by electrostatic flocking. Typically, each of the fiber layers 25, 25a, 250, 250a made of sheet member is formed by applying an adhesive to a tape and bonding numerous fibers on the tape in a state of being erected due to electrostatic charge or the like.

In numerous fibers constituting the fiber layers 25, 25a, 250, 250a, fibers erected from a base member and fibers inclined obliquely are mixed. In a case of electrostatically flocking fibers, there is a tendency that the erected fibers increase as the added charge becomes stronger, and the inclined fibers increase as the charge becomes weaker. It is preferable to use a sheet member to which fibers are attached in advance, rather than directly attaching fibers on a base member by electrostatic flocking. In the case where the sheet member to which fibers are attached in advance is used, there is no influence of the shape of the base member when attaching the fibers. Therefore, variation in the number of attached fibers is small and uniform. Further, an attached density is easily adjusted.

In a case where the sheet member to which fibers are attached in advance is affixed simultaneously with the extrusion molding of the outer belt molding 10 and the inner belt molding 100, it is preferable to use a tape formed of a material that is the same kind as or compatible with the sealing portions 16, 16a, 160, 160a which are affixed locations. For example, in a case where each of the sealing portions 16, 16a, 160, 160a is formed of TPO, it is preferable to use a tape made of olefin-based resin. In this way, the tape can be thermally welded by the residual heat immediately after the molding of the sealing portions 16, 16a, 160, 160a. The sheet member may be bonded to the sealing portions 16, 16a, 160, 160a by applying an adhesive. The thermal welding and the application of the adhesive may be used in combination.

The length of each fiber forming the fiber layers 25, 25a, 250, 250a may be in a range generally used conventionally in this type of belt molding. Specifically, fibers having a length of 0.3 to 1.0 mm, preferably 0.4 to 0.8 mm are used. Since the fiber is more easily bent as its length increases, it is advantageous for abnormal noise suppression to use the fiber whose length is as long as possible within this range. Since the fiber is difficult to bend when the fiber is too short, the fiber layers 25, 25a, 250, 250a are difficult to be in contact with the window pane 5 accurately. Thereby, there is a possibility that abnormal noise is likely to be generated when the window pane 5 is raised and lowered. On the other hand, when the fiber is too long, the sound insulation may be reduced.

The thickness of each fiber may be in a range generally used conventionally in this type of belt molding. Specifically, fibers having a thickness of 1.0 to 4.5 decitex (also referred to as dtex), preferably 1.5 to 3.5 decitex are used. The fiber is more easily bent when the fiber is thin. Therefore, it is advantageous for abnormal noise suppression and good sound insulation to use the fiber whose thickness is as thin as possible within this range. Since the fiber is difficult to bend when the fiber is too thick, the fiber layers 25, 25a, 250, 250a are likely to be caught with the window pane 5, and there is a possibility that abnormal noise is likely to be generated when the window pane 5 is raised and lowered. Further, there is a possibility that the sound insulation is lowered. On the other hand, when the fiber is too thin, durability may be reduced.

The "decitex" is a unit based on JIS L 0101 and JISL 0104 and means a weight per unit length. Generally, the "decitex" is used as a unit that indirectly represents the thickness of the fiber. Meanwhile, the fiber layers 25, 25a, 250, 250a in FIG. 2 are schematically illustrated with emphasis over actuality. Therefore, the actual thickness of the fiber layers 25, 25a, 250, 250a does not necessarily coincide with that shown in FIG. 2.

As the material of the fiber, polyamide resin such as nylon, polyester resin, polypropylene resin, acrylic resin, aramid resin, fluorine resin or the like can be used. When a material that is less likely to generate static electricity with respect to the window pane 5 made of glass is used, it is advantageous in that adsorption force is hardly applied between the fiber and the window pane 5 and the generation of abnormal noise is suppressed. The material that is less likely to generate static electricity with respect to the window pane 5 includes nylon or the like, for example.

The attached density of the fibers is at least 100 to 600 fibers/$mm^2$, preferably 150 to 550 fibers/$mm^2$, more preferably 180 to 500 fibers/$mm^2$. When the attached density of the fibers is less than 100 fibers/$mm^2$, each of the fiber layers 25, 25a, 250, 250a cannot exhibit its function effectively, and hence, abnormal noise is likely to be generated. Further, the skin surfaces (outer surfaces) of the sealing portions 16, 16a, 160, 160a are easily exposed through the fiber layers 25, 25a, 250, 250a, and the appearance of the belt molding may be deteriorated. When the attached density of the fibers is larger than 600 fibers/$mm^2$, the fibers are so dense that the fibers are difficult to bend when coming into sliding contact with the window pane 5 and the abnormal noise is likely to be generated.

In a case where there are a plurality of the sealing portions, the elastic contact state and sliding contact condition with the window pane 5 in each of the sealing portions are not necessarily the same. Therefore, even among the sealing portions, there are locations where abnormal noise is likely to be generated and locations where abnormal noise is less likely to be generated. Thus, it is possible to more effectively suppress the generation of abnormal noise by varying the attached density of the fibers according to the ease of generation of such abnormal noise.

Since the fibers are minute as described above, it is difficult to actually count the number of attached fibers. Therefore, the number of attached fibers can be schematically grasped by the following steps.

Step 1: The weight of one fiber (unit weight) and the weight of the belt molding before attaching the fibers are measured in advance.

Step 2: The total weight of the attached fibers are calculated by subtracting the weight of the belt molding before attaching the fibers from the weight of the belt molding after attaching the fibers.

Step 3: The total weight of the attached fibers is divided by the unit weight of the fiber.

Through the Steps 1 to 3, the number of the attached fibers can be schematically calculated. Further, through the following Step 4, the attached density of fibers per unit area can be calculated.

Step 4: The number of the attached fibers is divided by the area of the attached fibers.

The attached density of fibers in the present invention is based on the value calculated by the calculations of Step 1 to 4.

EXAMPLE

Next, examples (evaluation tests) of the present invention will be described. In the evaluation tests, the same belt molding as that shown in FIG. 2 was used. Fibers were attached to the contact portion of the belt molding at various attached densities, and the window pane and the contact portion were brought into sliding contact with each other in an elastic contact state under the following conditions. The presence or absence of generation of abnormal noise at that time and the standard deviation of the sliding waveform were obtained. The results are shown in Table 1. Meanwhile, the followings were used for the fiber and the fiber layer.

Fiber: Material; Polyester, Length; 0.5 mm, Thickness; 1.7 decitex

Fiber layer: A sheet member to which fibers are attached in advance at the attached densities shown in Table 1 by electrostatic flocking was attached to a polypropylene tape.

(Sliding Test Condition)
Window pane: New glass (Dry surface)
Sliding speed; 100 mm/s
Sliding stroke; 200 mm The sliding waveform means a graph obtained when data is plotted with respect to the following horizontal axis and vertical axis.

Horizontal axis: Displacement amount of two objects coming into sliding contact with each other, where the displacement amount is a relative movement amount of one object to the other object.

Vertical axis: Change amount in friction force generated between two objects when the two objects come into sliding contact with each other.

The standard deviation of the sliding waveform means a numerical value that represents the magnitude of the variation in the data forming the sliding waveform. As the standard deviation of the sliding waveform becomes lower, the stick-slip phenomenon is less likely to occur and the generation of abnormal noise is suppressed.

TABLE 1

|  | ATTACHED DENSITY OF FIBER (fibers/mm$^2$) | PRESENCE OR ABSENCE OF ABNORMAL NOISE | STANDARD DEVIATION OF SLIDING WAVEFORM ($\sigma$) |
|---|---|---|---|
| EXAMPLE 1 | 200 | ABSENCE | 0.032 |
| EXAMPLE 2 | 400 | ABSENCE | 0.033 |
| EXAMPLE 3 | 600 | ABSENCE | 0.060 |
| COMPARATIVE EXAMPLE 1 | 800 | PRESENCE | 0.110 |

From the results in Table 1, in Examples 1 to 3, the attached density of the fibers at the contact portion falls within a suitable range. As a result, abnormal noise is not generated and the standard deviation of the sliding waveform is low. In contrast, in Comparative Example 1, the attached density of the fibers at the contact portion is too high. As a result, abnormal noise is generated and the standard deviation of the sliding waveform is high.

REFERENCE SIGNS LIST

1 Vehicle Door
3 Window Opening
5 Window Pane
10 Outer Belt Molding
11 Outer Door Panel
12/120 Vehicle Exterior Sidewall Portion
13/130 Vehicle Interior Sidewall Portion
14/140 Connecting Portion
15/150 Body Portion
16/16a/160/160a Sealing Portion
18/180 Flange Portion
19/190 Engaging Portion
20/200 Holding Lip
22/22a/220/220a Seal Body Portion
24/24a/240/240a Contact Portion
25/25a/250/250a Fiber Layer
100 Inner Belt Molding
110 Inner Door Panel

The invention claimed is:

1. A belt molding for vehicle, the belt molding being configured to be mounted along a lower edge of a window opening of a vehicle door and come into sliding contact with a window pane which is raised and lowered in the window opening, the belt molding comprising:
 a body portion configured to be mounted to a door panel of the vehicle door; and
 a sealing portion configured to be in elastic contact with the window pane,
 wherein the sealing portion has a contact portion formed by attaching numerous fibers at a portion configured to be in contact with the window pane, and
 wherein attached density of the fibers is greater than 100 fibers/mm$^2$ and less than 300 fibers/mm$^2$.

2. The belt molding for vehicle according to claim 1, wherein a strip-shaped sheet member to which the fibers are attached in advance is affixed to the contact portion.

3. The belt molding for vehicle according to claim 2, wherein a plurality of the sealing portions are formed, and wherein the attached densities of the fibers at each of the sealing portions are different from each other.

4. The belt molding for vehicle according to claim 1, wherein the fibers are made of a polyamide resin, have a length of 0.3 to 1.0 mm and a thickness of 1.0 to 4.5 decitex.

* * * * *